United States Patent [19]

Florindez

[11] Patent Number: 5,476,035
[45] Date of Patent: Dec. 19, 1995

[54] BAKERY PAN INDEXING APPARATUS

[76] Inventor: Augusto Florindez, 13029 Ocaso Ave., La Mirada, Calif. 90638

[21] Appl. No.: 273,003

[22] Filed: Jul. 8, 1994

[51] Int. Cl.⁶ .................................................... B65G 47/00
[52] U.S. Cl. ..................................... 99/443 C; 198/464.2; 53/55; 53/505; 53/534; 53/67; 53/251; 53/246
[58] Field of Search ............................. 99/443 R, 443 C, 99/427; 198/690.1, 464.2, 464.3; 53/55, 505, 67, 534, 251, 246

[56] References Cited

U.S. PATENT DOCUMENTS

| | | | |
|---|---|---|---|
| 3,832,826 | 9/1974 | Ullman | 53/35 |
| 3,863,422 | 2/1975 | Wagner | 53/55 |
| 4,114,752 | 9/1978 | Scheik | 198/463.4 |
| 4,197,935 | 4/1980 | Aterianus et al. | 198/464.2 |
| 4,269,298 | 5/1981 | Mergl | 198/464.2 |
| 5,101,957 | 4/1992 | Scheik | 198/463.4 |
| 5,133,447 | 7/1992 | Florindez | 198/463.4 |

FOREIGN PATENT DOCUMENTS

| | | | |
|---|---|---|---|
| 2599348 | 12/1987 | France | 198/690.1 |
| 100579 | 9/1978 | Japan | 198/803.6 |

*Primary Examiner*—David Scherbel
*Assistant Examiner*—Tony G. Soohoo
*Attorney, Agent, or Firm*—John J. Connors; Connors & Associates

[57] ABSTRACT

Apparatus for manufacturing bakery products is disclosed where an individual dough packet 26 is deposited in a pan 24 made of magnetic material. Endless belts 16 and 18 including magnets 62 has a portion thereof in a path along which the pans 24 are advanced by conveyor belts 12 and 14. The pans 24 are magnetically coupled to the belts 16 and 18, and a sensor 20 is positioned along the path nearby a position Y where an individual dough packet 26 is deposited in a pan at this position.. The sensor 20 provides a control signal upon a pan 24 moving to this position. A motor 22 having a brake 70 and a clutch 72 drives the belts 16 and 18, and a pan 24 held by the belts is advanced upon actuation of the clutch and stopped upon actuation of the brake. A control circuit 80 includes a signal generator that provides a timing signal indicating that a dough packet 26 has been deposited in a pan 24. This circuit regulates the operation of the brake 70 and clutch 72 in response to the control signal and timing signal, enabling the control circuit 80, so that the belts 16 and 18 move a pan 24 in a step-wise fashion past the position Y where dough packets 26 are deposited in the pan.

8 Claims, 6 Drawing Sheets

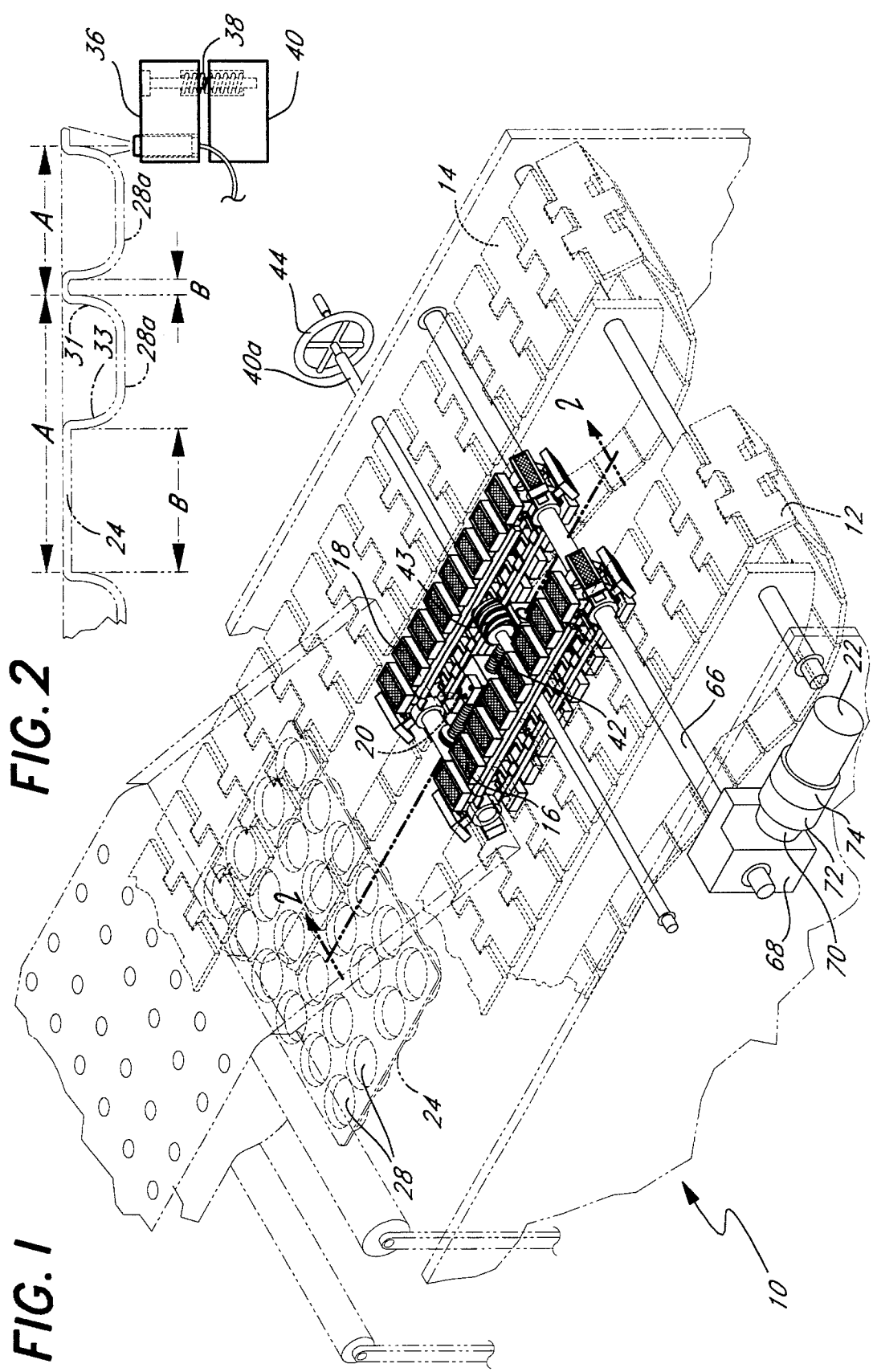
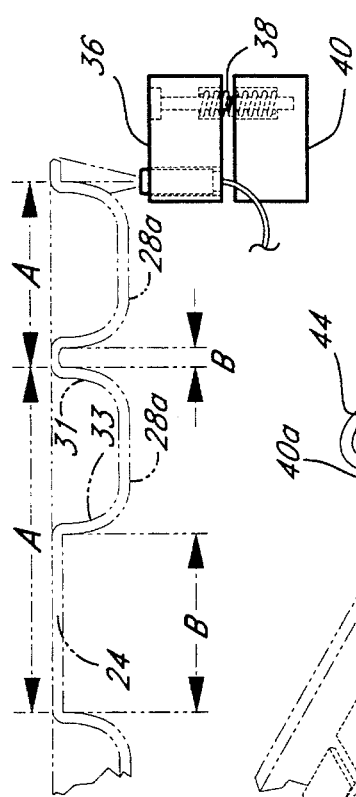
FIG. 1
FIG. 2

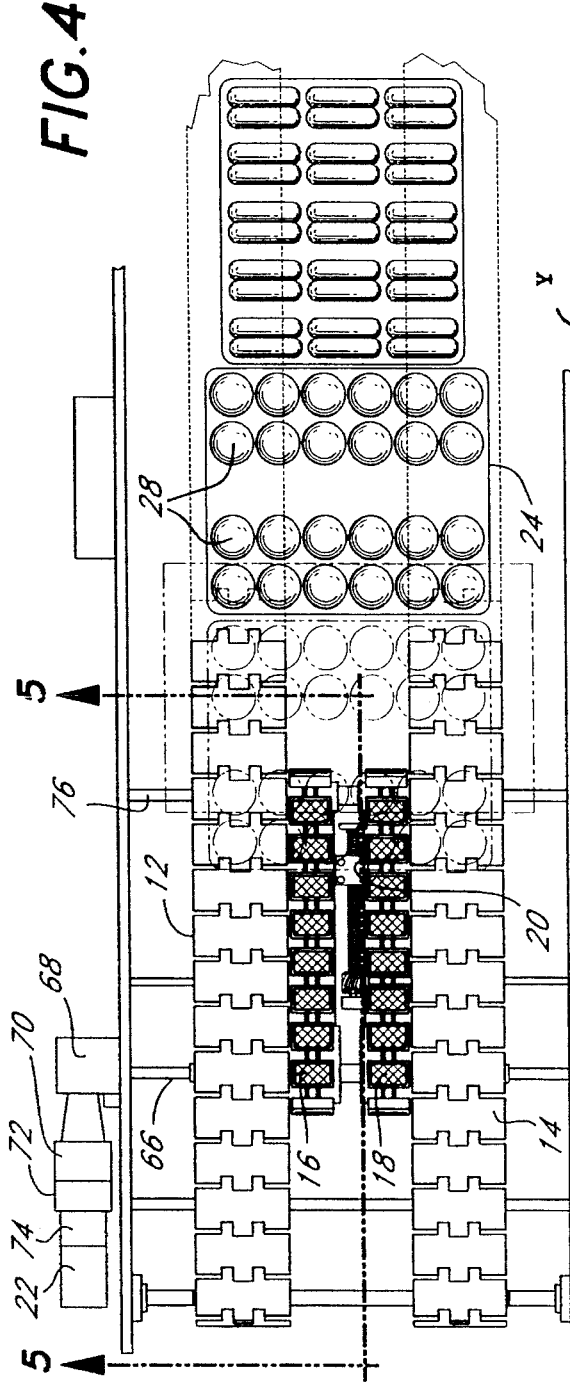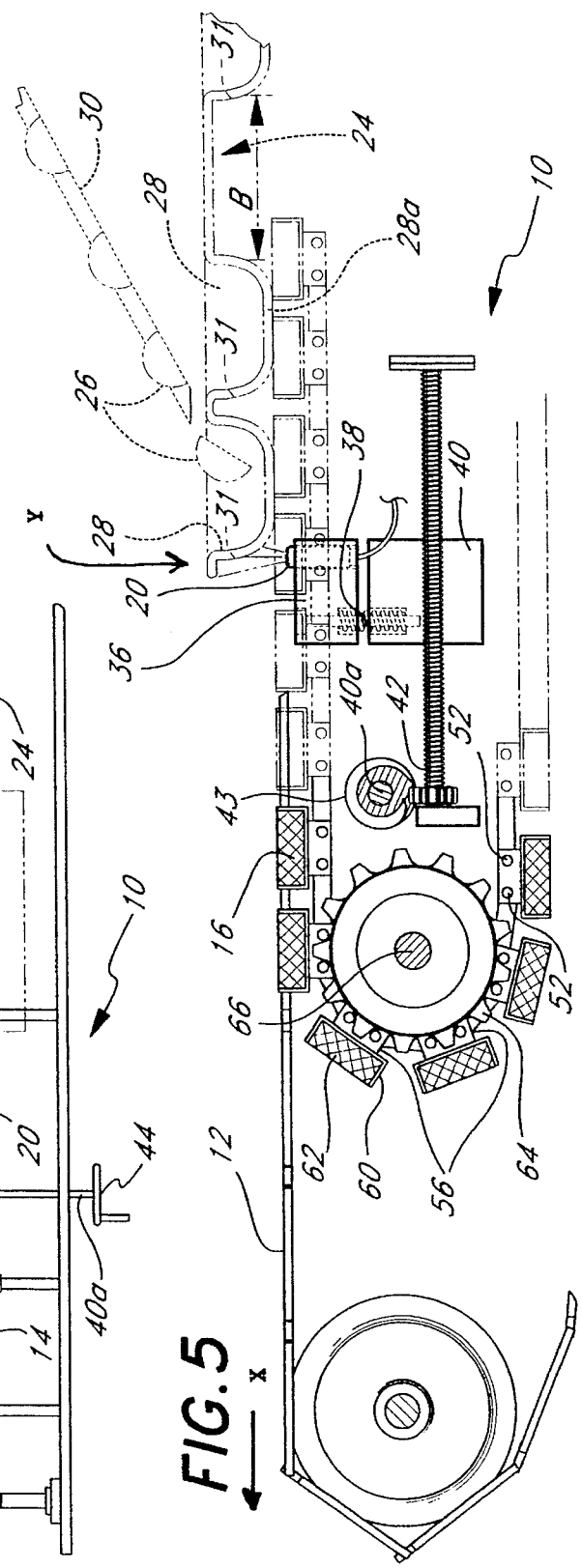

BAKERY PAN INDEXING APPARATUS

BACKGROUND OF THE INVENTION

1. Field of the Invention

This invention relates to an apparatus for moving bakery pans in a stepwise fashion past a point where dough packets are deposited in individual pockets in the pans. In particular, this invention relates to a magnetic type conveyor belt which holds the pans which are made of the magnetic ferrous material momentarily at the position where the dough packets are deposited in the pockets.

2. Background Discussion

In the baking industry, dough packets are deposited in pans that move in a stepwise fashion past a device which provides dough packets. The pans are positioned one after another in a series, usually with the leading edge of one pan abutting the trailing edge of another pan. Frequently, the type of bakery product being manufactured varies and the configuration of the pans used must be changed. For example, when making hamburger buns, the pans include rows of round pockets and, when making hotdog buns, the pans include rows of oblong shaped pockets. The individual pockets usually have an irregular bottom surface, with each pocket having a leading and trailing edge and individual pockets spaced apart from each other. U.S. Pat. Nos. 4,945,825; 5,003,367; 5,060,562; and 5,133,447 illustrate conventional types of equipment used to advance the pans in a stepwise fashion along a desired path past the machinery that deposits the individual dough packets in the pockets of the pans. The mechanical mechanisms depicted in these patents are disposed above the conveyor for the pans, so that it is possible that workers could accidentally be caught in the mechanisms and injured. It is the objective of this invention to provide a indexing apparatus for bakery pans that minimizes the use of mechanical mechanisms that might be a source of danger for workers.

SUMMARY OF THE INVENTION

The apparatus of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its advantages, which include safety and precise control of the positioning of the pans.

The first feature of the indexing apparatus of this invention is a conveyor for moving individual pans in series along a predetermined path. Individual dough packets are deposited in pans made of magnetic ferrous material, and an endless belt which includes magnets magnetically couples a pan to a portion of the belt in the path. The endless belt may comprise a plurality of individual links connected together to form the belt, with at least some of the links having attached thereto the magnets. The conveyor typically has a pair of spaced, parallel moving members which support a pan as the pan moves along the path. When using such a conveyor, the endless belt is disposed between the moving members of the conveyor.

The second feature is a sensor along the path nearby a predetermined position where an individual dough packet is deposited in a pan at this position. The sensor provides a control signal upon a pan moving to this position. In many cases, the individual pans include a series of pockets, with each pocket having a leading edge and a trailing edge, and adjacent pockets being separated by a space. The sensor is preferably a proximity sensor which senses each leading edge of each pocket and provides the control signal each time a leading edge moves to the sensor. Frequently, the pockets have an irregular bottom surface. The pans rides over the sensor as they advance, and the sensor is preferably mounted by a spring member to move towards and away from bottom surface in response to the irregularities of the bottom surface. The sensor is preferably mounted to be moved laterally along the path to enable the position of the sensor to be changed to compensate for pans of different configurations.

The third feature is a motor for driving the belt. The motor has a brake and a clutch, and the belt advances a pan held thereby along the path upon actuation of the clutch, and the belt stops the advance of a pan upon actuation of the brake.

The fourth feature is a control circuit for operating the brake and clutch in response to the control signal. The control circuit includes a signal generator that provides a timing signal indicating that a dough packet has been deposited in a pan. The timing signal and control signal enable the control circuit so that the belt moves a pan in a step-wise fashion past the predetermined position.

BRIEF DESCRIPTION OF THE DRAWINGS

The preferred embodiment of this invention, illustrating all its features, will now be discussed in detail. This embodiment depicts the novel and non-obvious apparatus of this invention shown in the accompanying drawing, which is for illustrative purposes only. This drawing includes the following figures (FIGS.), with like numerals indicating like parts:

FIG. 1 is a perspective view showing the magnetic belt used in the present invention disposed between moving members of a conveyor which supports pans as they are advanced along a path to a point where dough packets are deposited in the pockets of the pans.

FIG. 2 is a simplified cross-sectional view taken along line 2—2 of FIG. 1, showing a proximity sensor positioned to sense when the leading edge of a pocket moves to a position nearby the sensor.

FIG. 4 is a plan view of the apparatus of this invention.

FIG. 5 is a cross-sectional view taken along line 5—5 of FIG. 4, showing the dough packets being deposited in the pans as the pans are advanced by the apparatus of this invention.

FIG. 7a is an example of a logic table with instructions for setting address values in a programmable control circuit for running the apparatus of this invention.

FIG. 7b is a logic diagram analogous to the control circuit diagram of FIG. 6 and corresponding to the logic table of FIG. 7a.

DESCRIPTION OF THE PREFERRED EMBODIMENT

Figure 3:
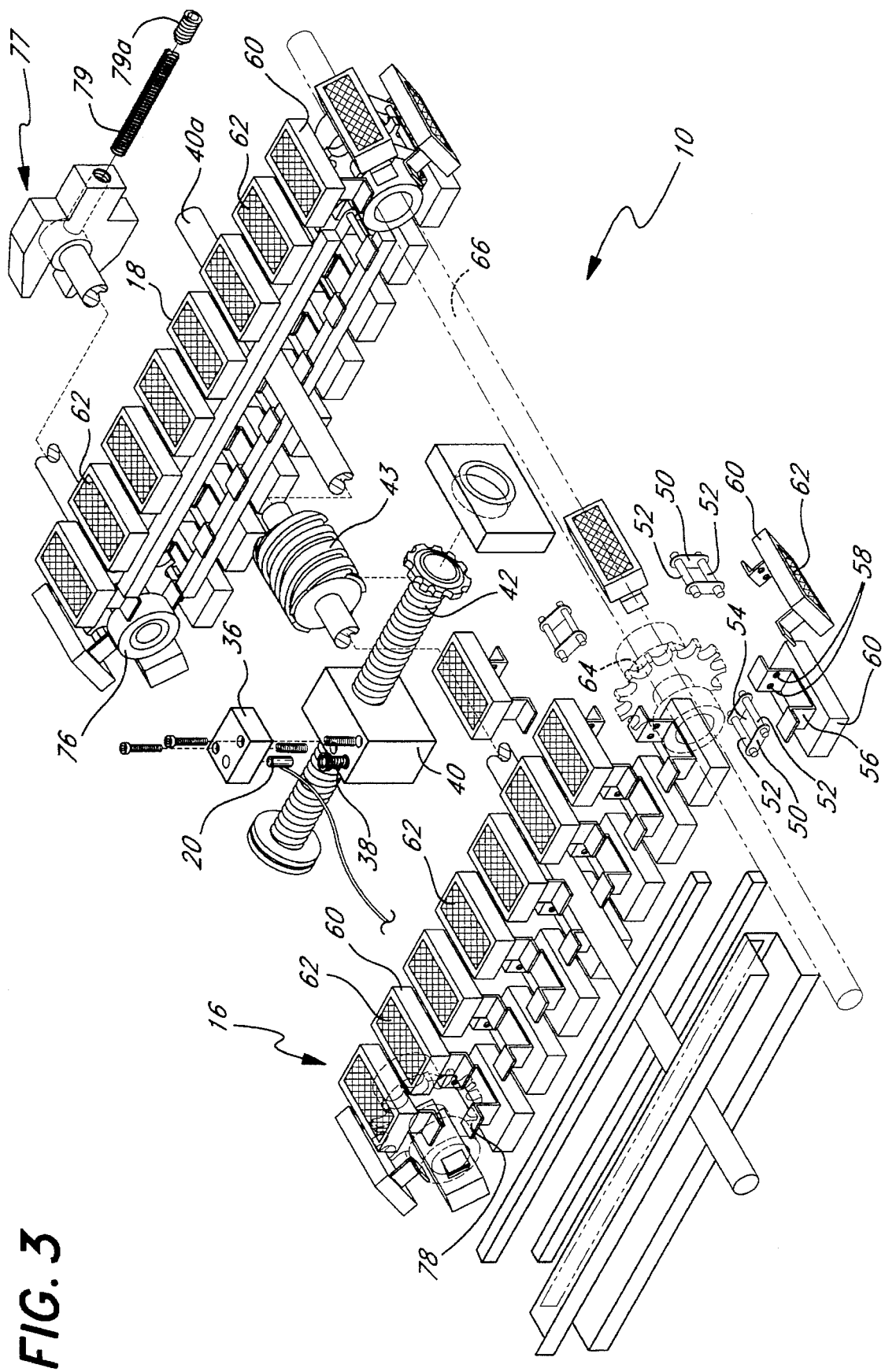
FIG. 3 is an exploded perspective view showing the components of the magnetic belt illustrated in FIG. 1.

The apparatus 10 of this invention, as best illustrated in FIGS. 1–5, includes a pair of conveyor belts 12 and 14, a pair of endless belts 16 and 18 disposed between the conveyor belts, a proximity sensor 20 disposed between the endless belts, and an electric motor 22 for driving the endless belts.

The two conveyor belts 12 and 14 are generally parallel to each other and are spaced apart a sufficient distance to enable the endless belts 16 and 18 to be disposed between them. These conveyor belts 12 and 14 are conventional and are used to support pans 24 which are moved by these conveyor belts along a predetermined path X past a position Y (FIG. 5) where dough packets 26 (FIG. 5) are deposited in individual pockets 28 in the pans 24. The pans 24 are made of a metal including iron, such as steel. The conveyor belts 12 and 14 are driven continuously by a motor (not shown). As shown in dotted lines in FIG. 5, the dough packets 26 are arranged in rows and slide down a ramp 30 into individual pockets 28 in the pans 24 row by row.

In accordance with this invention, the pans 24 are momentarily stopped at the position Y depicted in FIG. 5 to allow the dough packets 26 to drop into the individual pockets 28 in the pans. This is accomplished by magnets 62 on the belts 16 and 18 coupling to the metallic pans 24. Once the dough packets 26 are in the pockets 28, or at a point at which the dough packets contact the bottom of the pockets, the pan is advanced in a stepwise fashion to bring the next row of pockets 28 into position so that the next row of dough packets 26 can be deposited therein. As illustrated in FIG. 2, each pocket 28 has a leading edge 31 and a trailing edge 33, as defined by the direction of movement of the pans. The distance A between adjacent leading edges can vary greatly. Adjacent pockets 28 are separated by a gap B. The gap B can vary from one row of pockets 28 to the next, as illustrated in FIGS. 2 and 4.

The proximity sensor 20 may be of the magnetic type which provides a control signal when a metallic member such as the leading edge 31 of a pocket 28 moves into the proximity to the sensor. As best shown in FIG. 2, the sensor 20 is mounted in a first block 36. A second block 40 is connected to the underside of the first block 36 by a spring 38 so that, in instances when a rough irregular underside 28a of a pocket 28 moves across the sensor 20, the sensor 20 will be able to move towards and away from this surface 28a in response to the irregularities in the surface. Because the configuration of the pans 24 will vary depending upon the type of bakery product being made, it is desirable to also mount the sensor 20 so that it can be moved lengthwise or laterally along the predetermined path X. To accomplish this the block 40 is carried by lead screw 42 which is manually driven by a worm gear 43 attached to shaft 40a. Thus, the proximity sensor 20 can be, for example, moved towards the ramp 30 or away from the ramp 30 by turning a wheel 44 connected to the shaft 40a.

As depicted in FIG. 3, the endless belts 16 and 18 each comprises a series of interconnected links 50. Each link 50 includes a pair of pins 52 that extend between a pair of connecting arms 54. There is a generally U-shaped bracket 56 having in its opposed walls a pair of holes 58 that accept the outwardly extending ends of the pins 52. This arrangement allows the links 50 to be snapped into brackets 56 and be held firmly by the pins extending into the holes 58. Attached to each bracket 56 is a case 60 containing a magnet 62. The individual links 50 engage a sprocket 64 which is mounted on a drive shaft 66 connected via a gear box 68, brake 70, clutch 72, and reducer gear 74 to the motor 22.

There is an idler shaft 76 with sprockets 78 around which the endless belts 16 and 18 travel as the belts are driven by the motor 22. Each end of the idler shaft 76 is rotatably supported in a spring-loaded bearing 77 which is fixedly located to the apparatus frame. A spring 79 adjustable with a set screw 79a maintains a predetermined tension on the endless belts 16, 18 in order to compensate for variations in the contours of the bottom of the dough pans 24. In this manner, the magnets 62 in cases 60 may be individually depressed by misshapen pans 24 without unduly stressing the belt components.

Each time a row of dough packets 26 is deposited in a row of pockets 28, a timing or clock signal is generated. Any conventional means of generating this timing signal is suitable. For example, an electric eye could detect the deposition of the dough packets 26 in the pockets 28 and generate this signal, or a cam could actuate a switch with the movement of a conveyor for the dough packets, or any other suitable means. In a preferred embodiment, a cam timing proximity sensor (not shown) is mounted on a rotating shaft of the mechanism for advancing the rows of dough packets 26. The sensor is configured to send a signal at intervals calibrated to the period between moving rows of dough packets 26. In this way, the sensor can be calibrated to send a signal just when a row of dough packets 26 drops into a row of pockets 24.

The timing signal and the control signal from the proximity sensor 20 are used to switch the clutch 72 and brake 70 on and off. This momentarily stops the endless belts 16 and 18 so that a pan 24 at position Y pauses as dough packets 26 are deposited and then allows the pan to advance one step or interval to bring the next row of pockets 28 into position Y for the deposition of the next row of dough packets. In a preferred embodiment, the pan sensing proximity sensor 20 senses a leading edge of a row of pockets 28 and signals the clutch 72 to disengage and the brake 70 to engage, stopping the row of pockets directly under the bottom end of the ramp 30 to wait for a row of dough packets 26. The cam timing sensor is calibrated to signal when a row of dough packets 26 is dropping from the ramp. Alternatively, the timing signal is created by a light beam being interrupted as dough packets fall into the pans. At that point, the clutch 70 engages and the brake 70 releases to start the endless belts 16, 18 propelling the pan 24 forward to merge with and "catch" the dropping dough packets. The pan 24 will continue its travel until the pan sensing proximity sensor 20 again senses a leading edge of a row of pockets 28.

Figure 6:
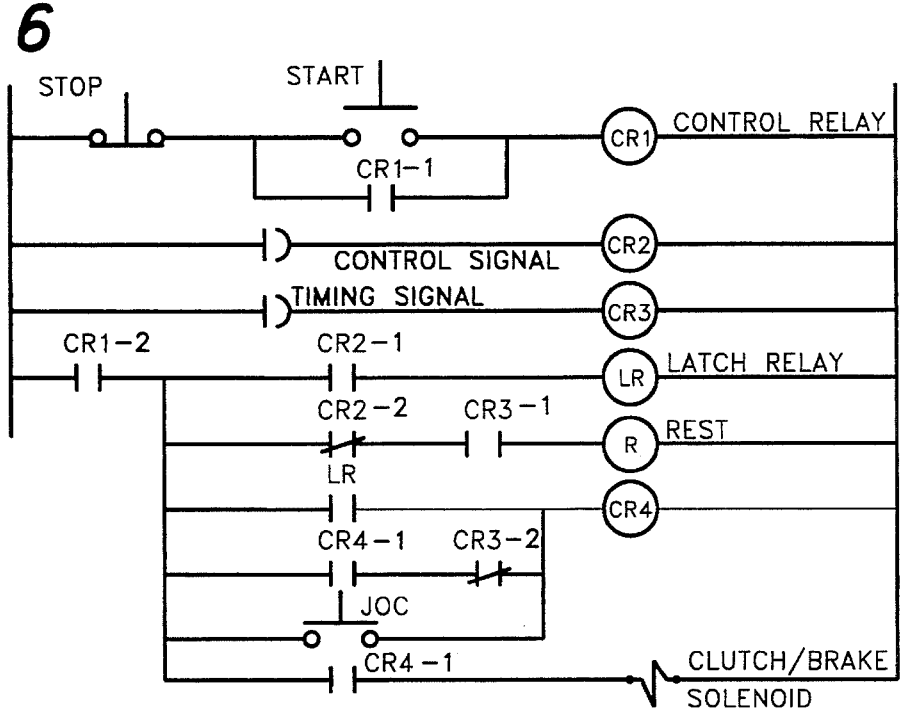
FIG. 6 is a control circuit diagram for this invention.

FIG. 6 illustrates a schematic control circuit 80 for regulating the operation of the apparatus 10. There are four relays CR1, CR2, and CR3, and CR4 connected as illustrated having respective there contacts CR1-1, CR1-2, CR2-1, CR2-2, CR3-1, CR3-2, CR4-1, and CR4-2 connected in the circuit 80 as shown. A latch relay LR and its reset R, in conjunction with the relays CR1, CR2, and CR3, and CR4, insure that when the brake 70 is engaged the clutch 72 is disengaged, and vice versa. A manually actuated start switch 82 is turned on to supply power to the circuit 80, and a solenoid 84 for operating the brake 70 and clutch 72 is energized and de-energized as the pans 24 move to position Y. A manually actuated override switch JOG allows the user to advance the pans continually without indexing.

A conventional programmable controller purchased from Omron, Inc. or Allen Bradley is programed in a conventional manner using Bolean algebra. The controller insures that the control signal provided by the sensor 20 and the timing signal actuate the relays CR1 and CR2 at the same time. The following is the manner in which the programmable controller is programmed.

Figures 7A, 7B:
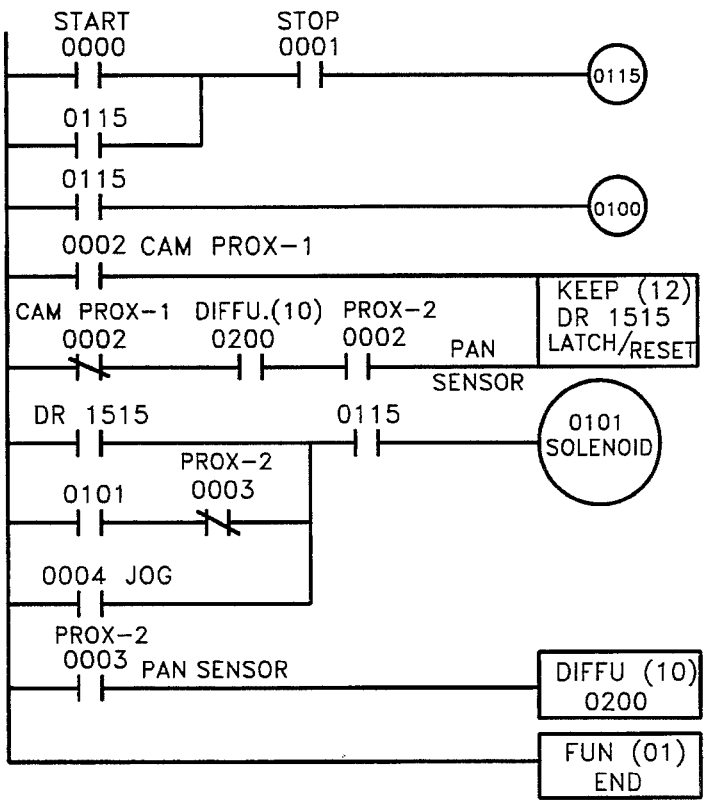

With reference to FIGS. 7a and 7b first, one embodiment of a programmable control circuit using the Omron, Inc. resident software is shown. FIG. 7a represents a logic table corresponding to the logic "circuit" shown in FIG. 7b. Essentially, both the table and circuit comprise operational loops completed every clock cycle of the operating system.

The CPU samples each operand for its value in each cycle. The operands demonstrate TRUE or FALSE values upon sampling based on the condition of the physical device each operand represents.

In the example shown, the operands are assigned the following physical devices:

| | |
|---|---|
| 0000 | START RELAY |
| 0001 | STOP RELAY |
| 0115 | POWER RELAY |
| 0100 | INDICATOR LIGHT |
| 0002 | CAM TIMING PROXIMITY SENSOR |
| 0200 | DIFFERENTIAL UP DEVICE |
| 0003 | PAN SENSING PROXIMITY SENSOR |
| DR 1515 | LATCH RELAY/RESET |
| 0101 | CLUTCH/BRAKE SOLENOID |
| 0004 | JOG SWITCH |

Figure 8A:
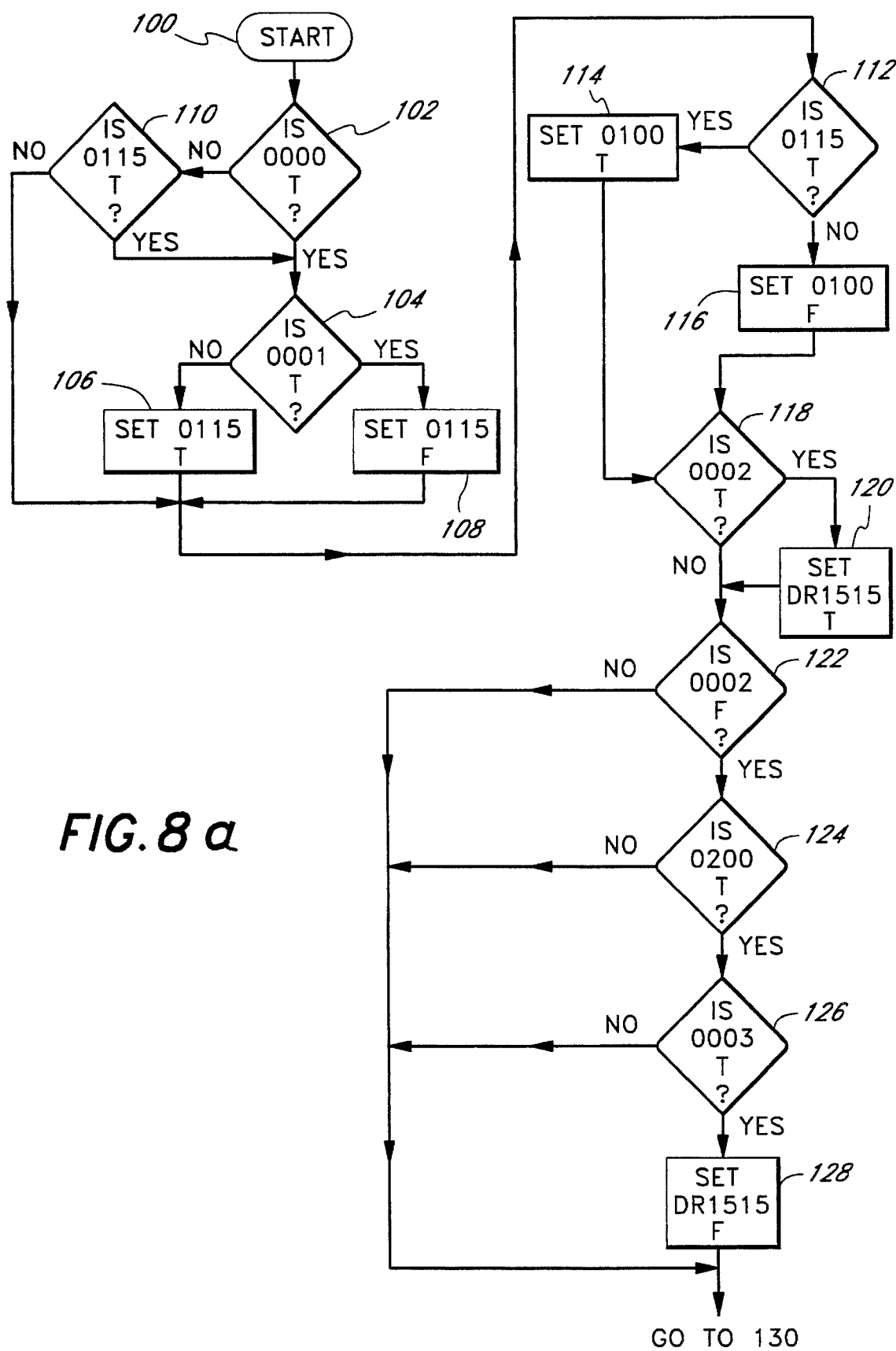
FIGS. 8a and 8b together comprise a flowchart paralleling the logic diagram of FIG. 7.

One of skill in the art of programmable control circuits will be able to easily follow the given instructions. Alternatively, one can utilize another logic circuit, while still following generally the flowchart given in FIGS. 8a, 8b.

With reference to the flowchart, an operator begins by pushing the start button setting the value of the operand 0000 momentarily to TRUE. The decision block 102 represents a query from the CPU to the ON button operand 0000. As 0000 has momentarily been set to TRUE, decision block 104 is reached asking if the OFF button operand 0001 is TRUE. If the OFF button is not depressed during that particular cycle, the operand 0115 is set to TRUE in action block 106. Operand 0115 represents a critical safety relay placed to shut off the movement of the dough pans 24 if the OFF button is depressed, as will be described below. Operand 0115 also maintains its own TRUE status until the OFF button is depressed. More specifically, if the device has been started, decision block 102 returns NO as the ON button is spring loaded and the operand 0000 normally stores a FALSE value. However, since operand 0115 remains TRUE until the OFF button is pushed, decision block 110 routes the flow of logic back to decision block 104 to check if the OFF button has been pressed. Only if the OFF button operand 0001 becomes TRUE will decision block 104 returns a YES value and operand 0115 be set to FALSE in action block 108.

Decision block 112 again samples operand 0115 and an indicator light represented by operand 0100 is turned on for TRUE and off for FALSE in action blocks 114 and 116, respectively. Assuming the machine is up and running and operand 0115 is TRUE, decision block 118 then checks the status of operand 0002, which represents the cam timing proximity sensor, as described previously. The cam timing proximity sensor is energized, and operand 0002 returns TRUE, when a row of dough packets 26 are ready to drop into a row of pockets 28. When this occurs, action block 120 sets operand DR 1515 to TRUE, which actuates the clutch/brake latch relay. The latch relay remains on, and the pan conveyor belts 16, 18 continue to move, until the latch relay is reset.

At this point, decision blocks 122, 124 and 126 comprise a latch relay reset subloop. All of the values returned by decision blocks 122, 124 and 126 must be TRUE for the latch relay to be reset. Decision block 122 checks the negative status of operand 0002, representing the cam timing proximity sensor. Decision block 124 checks the status of operand 0200, representing a Differential Up logic device. The Differential Up simply toggles between TRUE and FALSE in each clock cycle when actuated, and functions in this particular logic circuit to prevent an inadvertent reset of the latch relay, as will be explained below. Decision block 126 checks the status of operand 0003, representing the pan sensing proximity sensor 20. If all the decision blocks 122, 124 and 126 return TRUE values, the latch relay is reset and operand DR 1515 set to FALSE in action block 128.

Figure 8B:
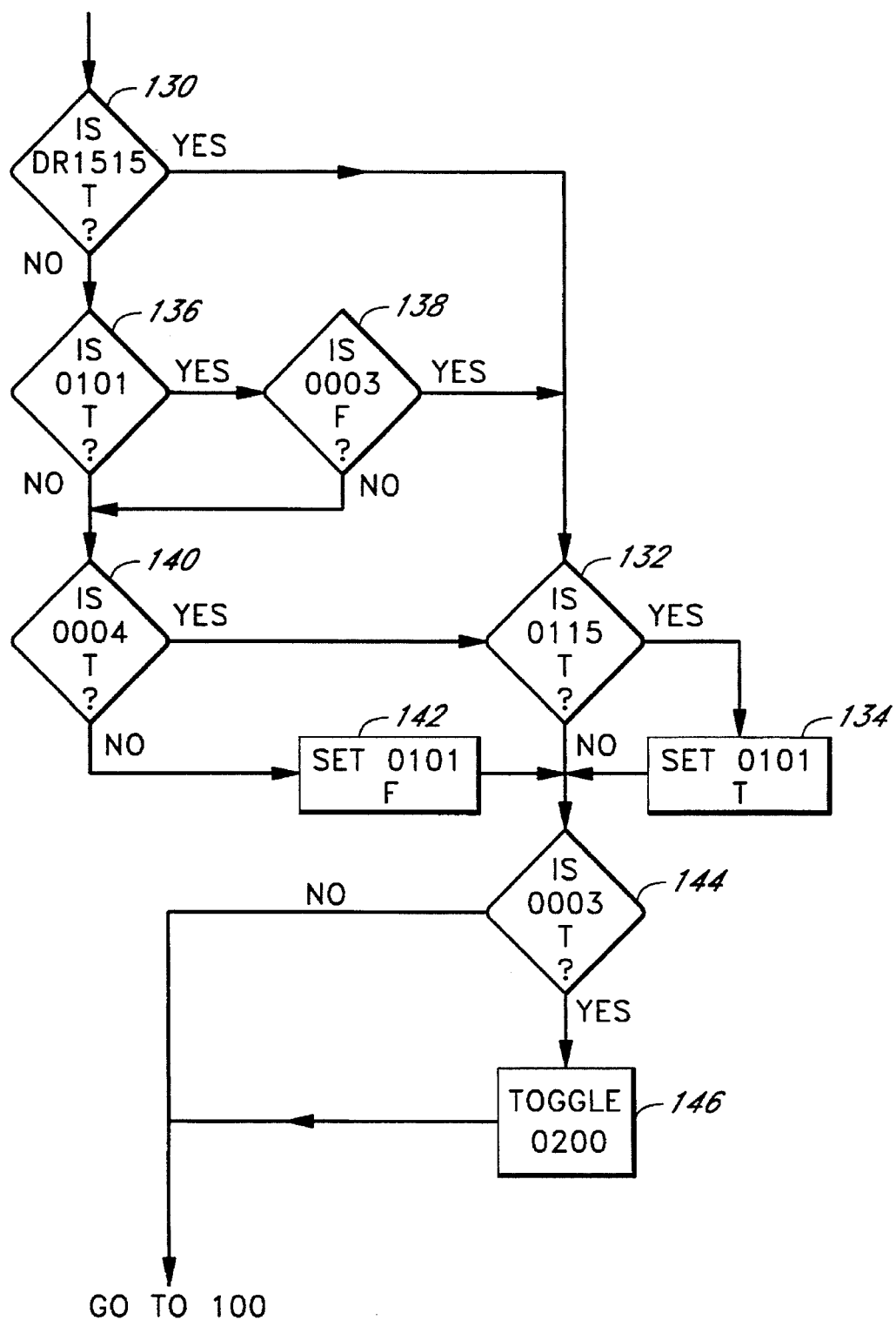

Now turning to FIG. 8b, decision block 130 checks the status of operand DR 1515, or whether the latch relay is on. If the latch relay is on, decision block 132 determines the status of operand 0115, which will be on unless the OFF button is currently depressed, as mentioned above. In operation, action block 134 will switch operand 0101 to TRUE from an initially FALSE status, representing an energizing of the clutch/brake solenoid to start, or maintain, the pan conveyor running.

In case operand DR 1515 has been reset to FALSE in action block 128, decision block 136 asks whether operand 1010 is TRUE, or whether the clutch/brake solenoid is on and pan conveyor running. If so, decision block 138 checks the negative status of operand 0003, the pan sensing proximity sensor. If both decision blocks 136 and 138 return TRUE, decision block 132 is reached. In practice, the baking pans 24 may warp or, from abuse, develop an uneven bottom surface, which might inadvertently trigger the pan sensing proximity sensor 20 before the next pocket leading edge is reached. Because of this potential error, decision blocks 136 and 138 are provided as insurance that the pan conveyors 16 and 18 will continue to move until the next pocket 28 leading edge is reached.

If either decision blocks 136 or 138 return no, decision block 140 checks the status of operand 0004 representing a JOG override switch. If the JOG switch is depressed by the operator, decision block 132 is again reached and the clutch/brake solenoid remains energized, if the OFF button has not been depressed, via blocks 132 and 134. The JOG option allows an operator to bypass any of the various sensor conditions to maintain the pan conveyors 16, 18 running. If decision block 140 is reached and returns a NO value, then the clutch/brake solenoid is de-energized and operand 0101 set to FALSE in action block 142.

Finally, decision block 144 queries whether operand 0003 is TRUE, or whether the pan sensing proximity sensor is energized by the presence of a pocket 28. If so, Differential Up device is energized and operand 0200 toggles from TRUE to FALSE, or visa versa.

At the end of the loop, the logic circuit repeats the entire sampling sequence over by returning to block 100. Because of this manner of programming the programmable controller, it is only the leading edge of a pocket 28 which causes a pan 24 to stop at position Y.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

I claim:

1. Apparatus for manufacturing bakery products using pans made of magnetic material, said individual pans including a series of pockets, each pocket having a leading edge and a trailing edge, said bakery products being made from individual dough packets that are deposited in the individual pockets, said apparatus including a conveyor for moving individual pans in series along a predetermined path, an endless belt including magnets that has a portion thereof in said path, so that a pan is magnetically coupled to the belt upon being advanced by said conveyor to the belt, a proximity sensor nearby a predetermined position along said path where an individual dough packet is deposited in a pan at said position, said sensor sensing each leading edge of each pocket and providing a control signal each time a leading edge moves to said sensor, a mechanism which mounts said sensor to enable the position of the sensor to be changed to compensate for pans of different configurations, and a motor for driving the belt, said motor having a brake and a clutch, said belt advancing a pan held thereby along said path upon actuation of the clutch, and said belt stopping the advance of a pan held thereby upon actuation of the brake, and a control circuit for operating said brake and clutch in response to said control signal.

2. The apparatus of claim 1 including a signal generator that provides a timing signal indicating that a dough packet has been deposited in a pan, said timing signal and control signal enabling the control circuit so that the belt moves a pan in a step-wise fashion past said predetermined position.

3. The apparatus of claim 1 where said conveyor has a pair of spaced, parallel moving members which support the pan as said pan moves along said path, and the endless belt is disposed between said moving members.

4. The apparatus of claim 1 where the endless belt includes a plurality of individual links connected together to form said belt, and at least some of said links having attached thereto said magnets.

5. Apparatus for manufacturing bakery products using pans made of magnetic material, said individual pans including a series of pockets, each pocket having an irregular bottom surface, said bakery products being made from individual dough packets that are deposited in the individual pockets, said apparatus including a conveyor for moving individual pans in series along a predetermined path, an endless belt including magnets that has a portion thereof in said path, so that a pan is magnetically coupled to the belt upon being advanced by said conveyor to the belt, a sensor nearby a predetermined position along said path where an individual dough packet is deposited in a pan at said position, a mechanism which mounts said sensor to enable the position of the sensor to be changed to compensate for pans of different configurations, said mechanism including a spring member to move the sensor towards and away from the irregular bottom surface in response to the irregular bottom surface as said pan rides over the sensor as the pan advances along said path, said sensor providing a control signal upon said pan moving to said position, and a motor for driving the belt, said motor having a brake and a clutch, said belt advancing a pan held thereby along said path upon actuation of the clutch, and said belt stopping the advance of a pan held thereby upon actuation of the brake, and a control circuit for operating said brake and clutch in response to said control signal.

6. The apparatus of claim 5 including a signal generator that provides a timing signal indicating that a dough packet has been deposited in a pan, said timing signal and control signal enabling the control circuit so that the belt moves a pan in a step-wise fashion past said predetermined position.

7. The apparatus of claim 5 where said conveyor has a pair of spaced, parallel moving members which support the pan as said pan moves along said path, and the endless belt is disposed between said moving members.

8. Apparatus for manufacturing bakery products where an individual dough packet is deposited in a pan made of magnetic material, including a conveyor which advances individual pans in series along a predetermined path, an endless belt including magnets that has a portion thereof in said path to couple magnetically a pan to the belt upon being advanced by said conveyor to the belt, a sensor nearby a predetermined position along said path where an individual dough packet is deposited in a pan at said position, said sensor providing a control signal upon a pan moving to said position, a mechanism which mounts said sensor to enable the position of the sensor to be changed to compensate for pans of different configurations, and a motor for driving the belt, said motor having a brake and a clutch, said belt advancing a pan held thereby along said path upon actuation of the clutch, and said belt stopping the advance of a pan held thereby upon actuation of the brake, a signal generator that provides a timing signal indicating that a dough packet has been deposited in a pan, and a control circuit for operating said brake and clutch, said timing signal and control signal enabling the control circuit to operate the brake and clutch so that the belt moves a pan in a step-wise fashion past said predetermined position.

* * * * *